Figure 7:
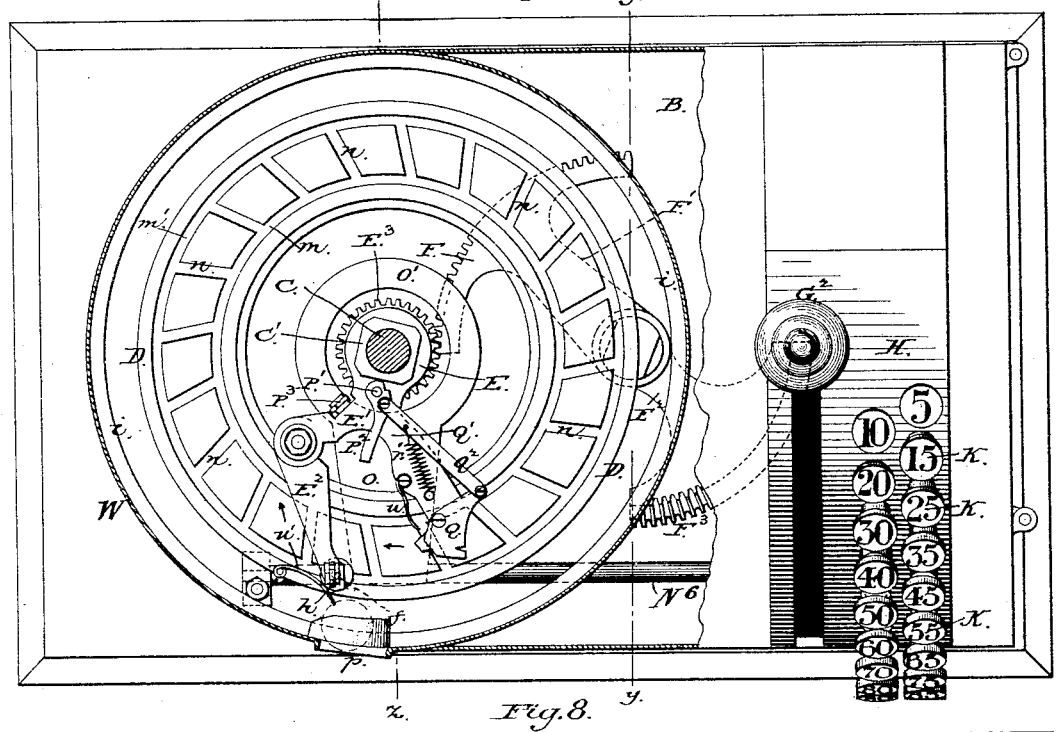

(No Model.) 5 Sheets—Sheet 1.
L. T. WEISS.
MACHINE FOR DELIVERING AND ADDING CHECKS.
No. 348,369. Patented Aug. 31, 1886.
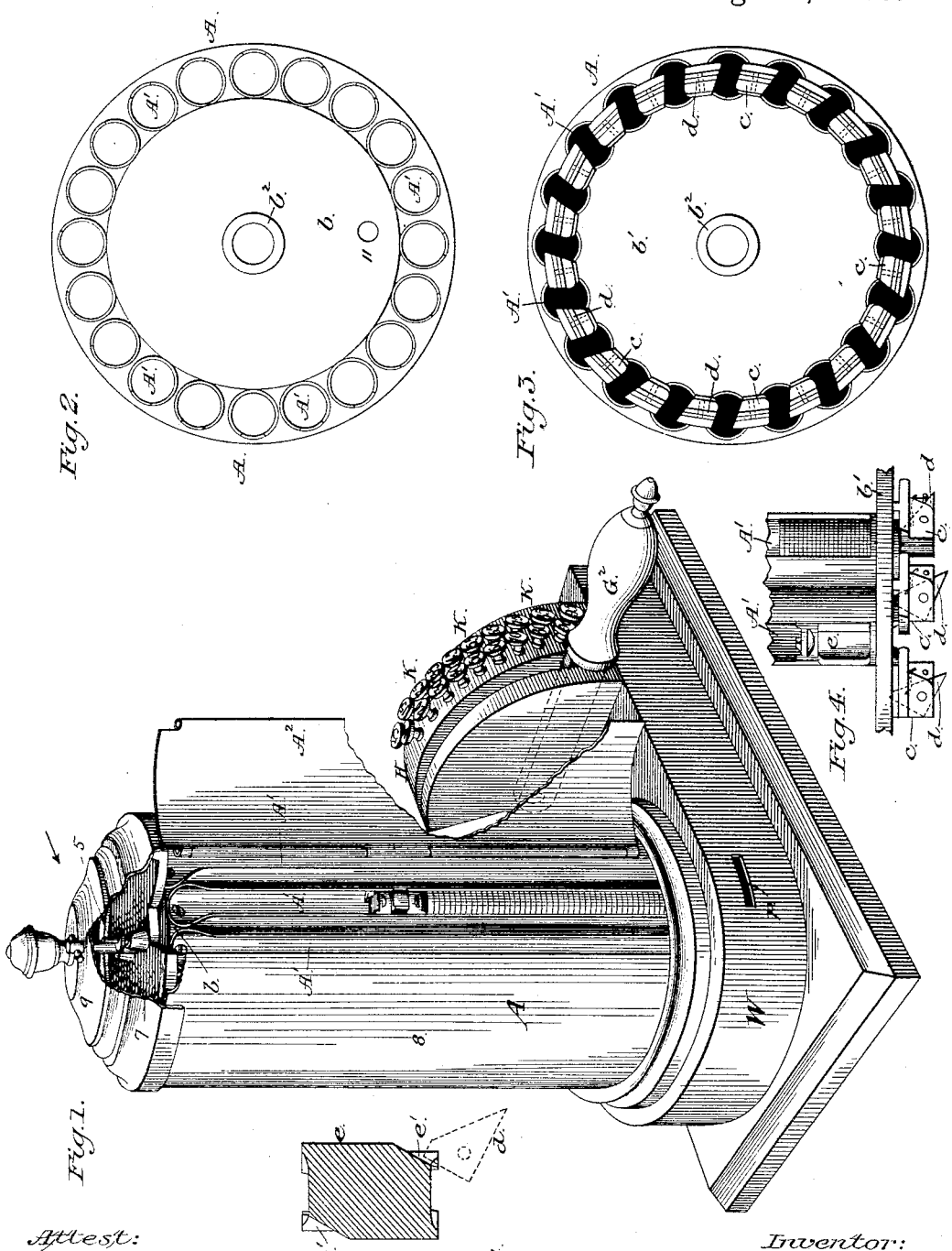

(No Model.)  5 Sheets—Sheet 2.
L. T. WEISS.
MACHINE FOR DELIVERING AND ADDING CHECKS.
No. 348,369. Patented Aug. 31, 1886.
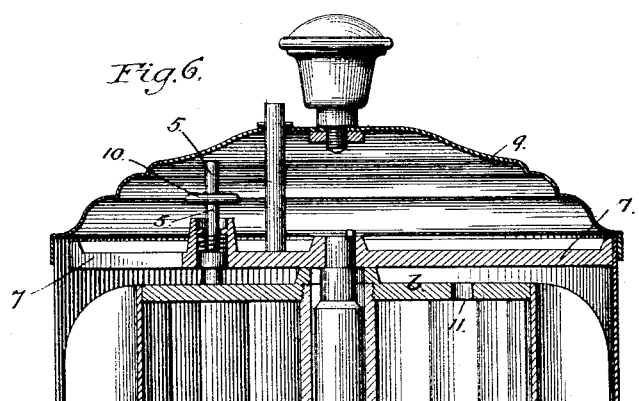
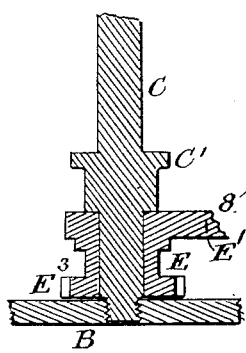
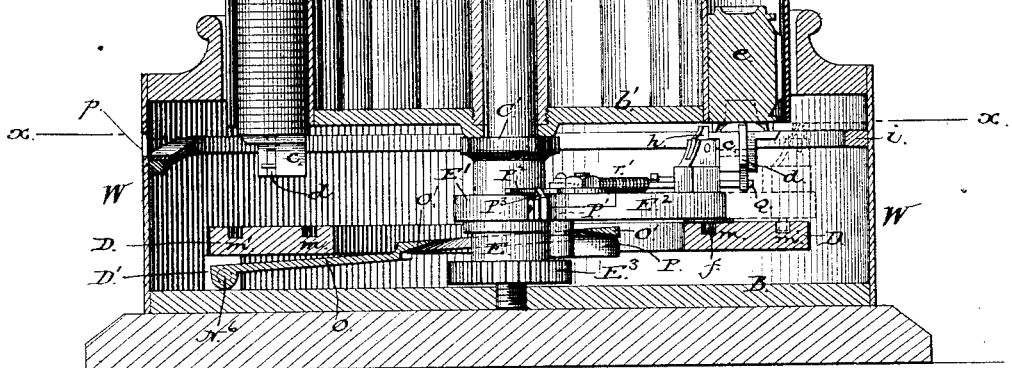
Attest:
John A. Ellis.
H. B. Moore.
Inventor:
Louis T. Weiss
By David A. Burr
Atty.

(No Model.) 5 Sheets—Sheet 3.
L. T. WEISS.
MACHINE FOR DELIVERING AND ADDING CHECKS.
No. 348,369. Patented Aug. 31, 1886.

Attest:
John A. Ellis
A. B. Moore

Inventor:
Louis T. Weiss
By David A. Burr
Atty.

(No Model.) 5 Sheets—Sheet 4.
L. T. WEISS.
MACHINE FOR DELIVERING AND ADDING CHECKS.
No. 348,369. Patented Aug. 31, 1886.

Attest:
John A. Ellis
A. B. Moore

Inventor:
Louis T. Weiss
By David A. Burr
Atty.

(No Model.) 5 Sheets—Sheet 5.
L. T. WEISS.
MACHINE FOR DELIVERING AND ADDING CHECKS.
No. 348,369. Patented Aug. 31, 1886.
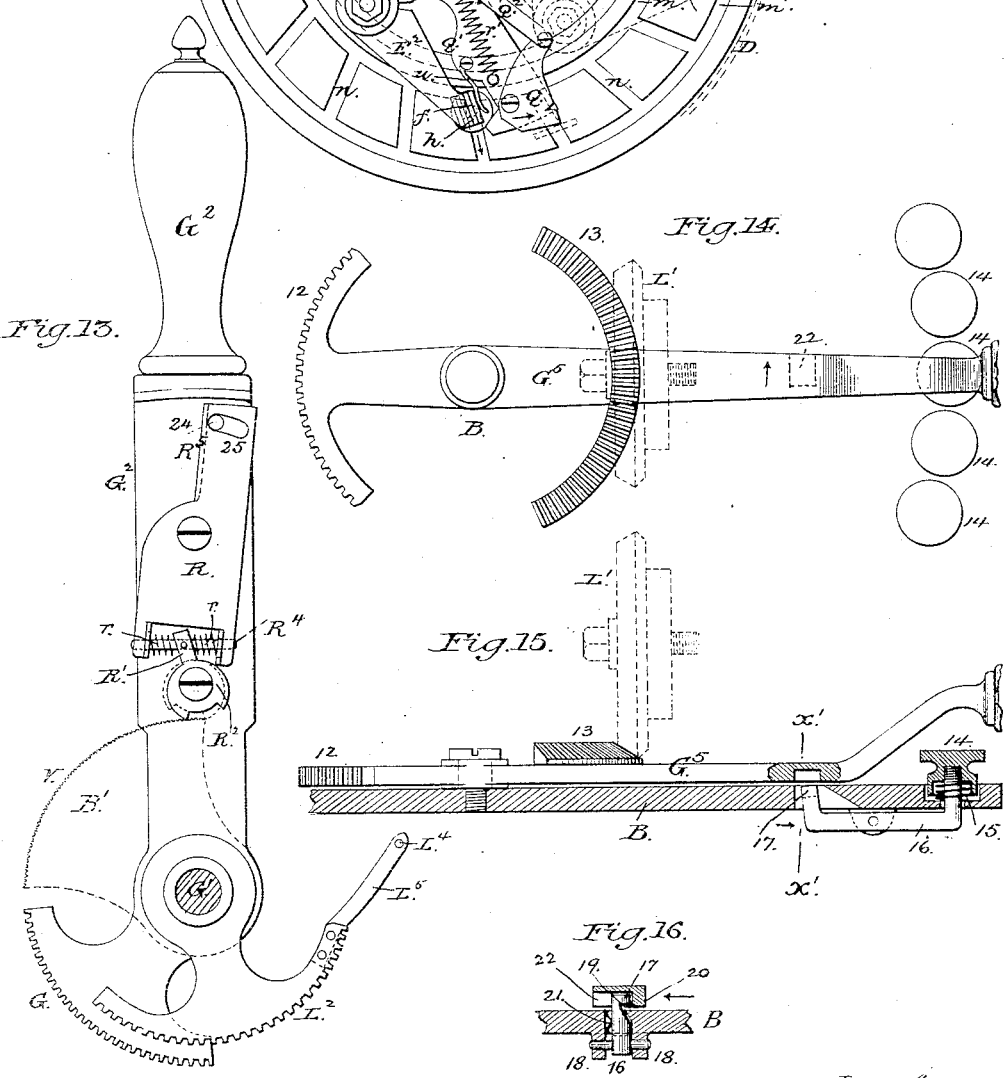
Attest:
John A. Ellis.
H. B. Moore.
Inventor:
Louis T. Weiss
By David A. Burr
Atty.

UNITED STATES PATENT OFFICE.

LOUIS T. WEISS, OF BROOKLYN, ASSIGNOR TO THE KRUSE CHECK AND ADDING MACHINE COMPANY, OF NEW YORK, N. Y.

MACHINE FOR DELIVERING AND ADDING CHECKS.

SPECIFICATION forming part of Letters Patent No. 348,369, dated August 31, 1886.

Application filed December 12, 1885. Serial No. 185,464. (No model.)

*To all whom it may concern:*

Be it known that I, LOUIS T. WEISS, of Brooklyn, in the county of Kings and State of New York, have invented a new and useful Improvement in Machines for Delivering and Adding Checks; and I do hereby declare that the following is a full and exact description thereof, reference being had to the accompanying drawings, and to the letters of reference marked thereon, making a part of this specification.

My invention relates to a novel apparatus, as hereinafter described, for the delivery, at will, from a stationary magazine or check-cylinder comprising a series of receptacles, each adapted to contain metallic checks of a different denomination, of a check from any one of said receptacles by the throw of a lever, the length of whose movement, as determined by the movement of one of a series of stop-keys, governs in turn the selection of the check to be delivered, whereby a check is invariably delivered from the same receptacle by the movement of the one key appropriate thereto.

It relates, furthermore, to the combination, with the lever, of a counting and adding mechanism, whereby the throw of the lever, to produce the delivery of any one check, will produce a proportionately-extended movement of said mechanism, so that the sum previously indicated by the counting mechanism will be thereupon increased by a number corresponding to that of the denomination of the check delivered by said throw.

It relates, also, to a combination of devices, as hereinafter described, whereby when any one of the check-receptacles is emptied of checks the counting mechanism will be thrown out of gear at each movement of the lever which would operate to deliver a check from said receptacle, so that the throw of the lever when inoperative to deliver a check, shall not operate to move the counting mechanism.

Figure 8:
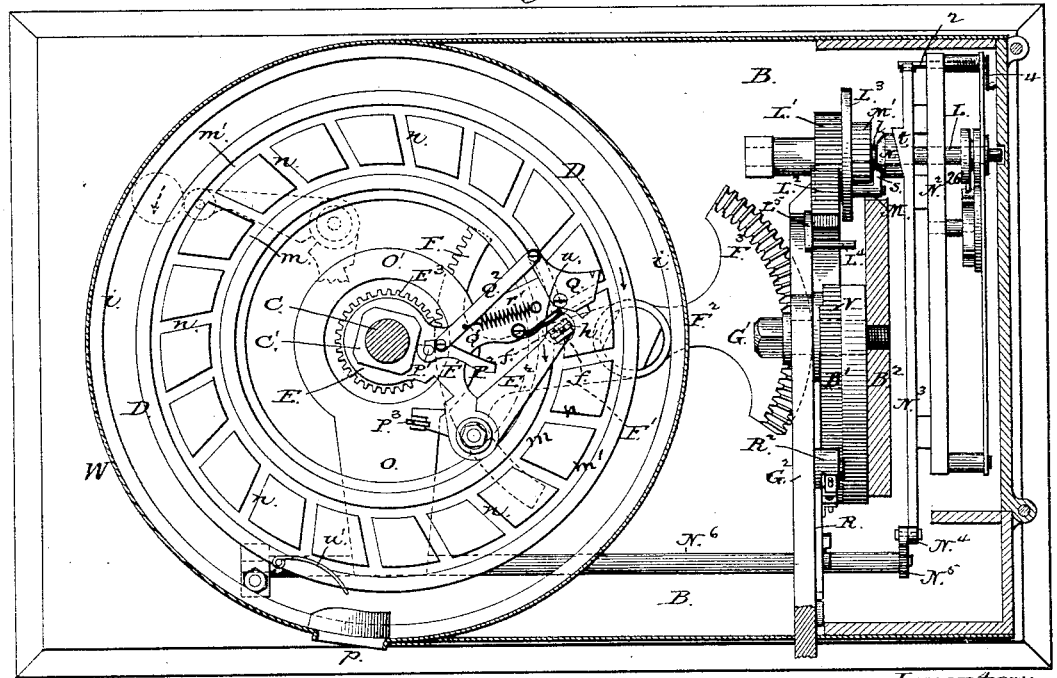
Figure 9:
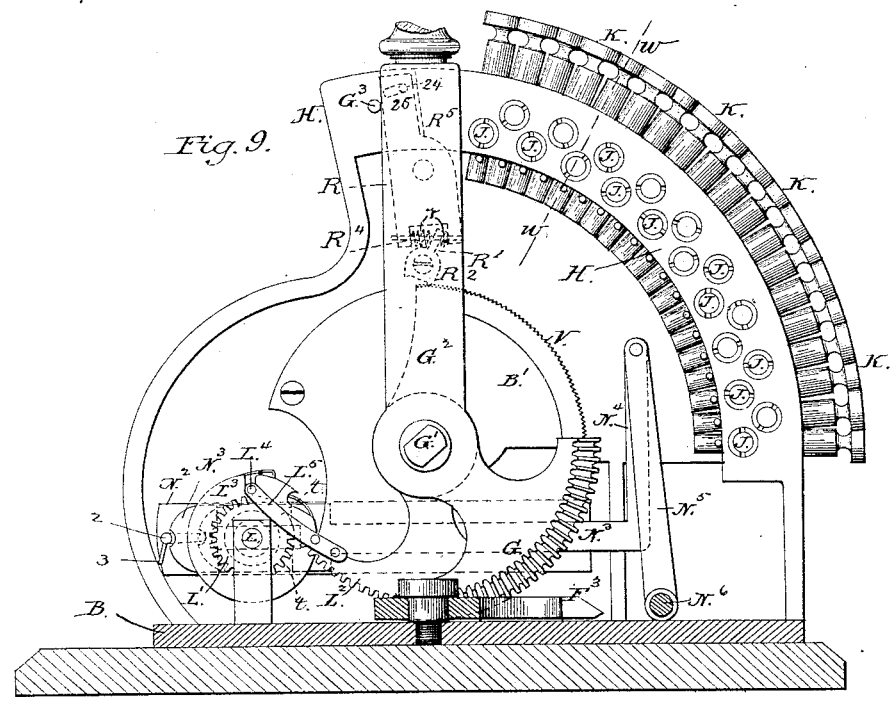
Figure 10:
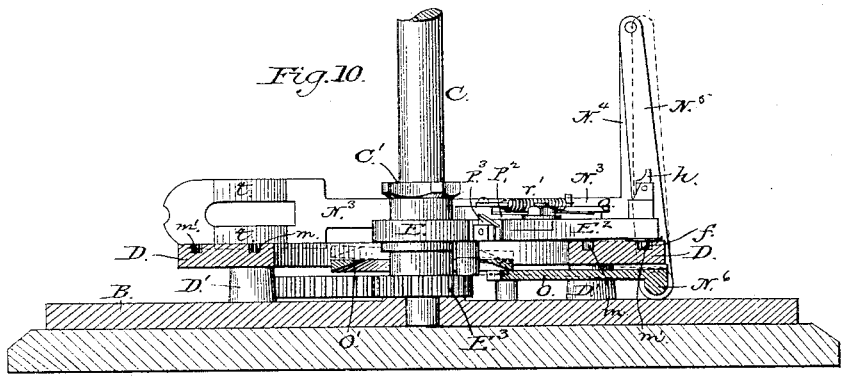
Figure 11:
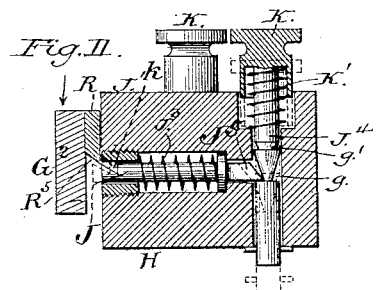

In the accompanying drawings, Figure 1 is a view in perspective of my improved check delivering and adding machine, with a portion of its top casing over the check-cylinder broken out, and the door in said casing thrown open. Figs. 2 and 3 are respectively a top and a bottom view of the check-cylinder removed from the machine. Fig. 4 is a side elevation of a portion of the lower end of the cylinder, and of two of its check-receptacles; Fig. 5, a longitudinal diametric section and an end view of one of the weights for the check-receptacles; Fig. 6, a vertical central section through the check-cylinder and base of the machine, looking in the direction indicated by the arrow in Fig. 1, the check-receptacle on the left hand being shown as partly filled, and that on the right as wholly emptied, and with the retracting-arm in position to pass under the weight at the bottom of said empty receptacle; Fig. 7, a horizontal section in line $x\ x$ of Fig. 6, through the base of the machine, immediately under the check-cylinder, with the remainder of the machine shown in elevation, affording a top view of the key-frame and key. The retracting and count-regulating arms are in this view shown at rest at the check-delivery point, the actuating-lever being at the zero-point. Fig. 8 is a similar sectional view, including the whole length of the machine, illustrating the lever as thrown forward toward one of the stop-pins, and the retracting and count-regulating arms moving back toward the check-receptacle corresponding to said stop-pin; Fig. 9, a transverse section in line $y\ y$ of Fig. 7, illustrating the position and arrangement of the stop-key in reference to the actuating-lever, and the gear of the latter with the adding mechanism; Fig. 10, a diametric section through the base of the machine under the check-cylinder in line $z\ z$ of Fig. 7, looking toward the actuating-lever; Fig. 11, a detailed sectional view, on an enlarged scale, in line $w\ w$ of Fig. 9, illustrating one of the stop keys and pins; Fig. 12, a partial horizontal section in line $x\ x$ of Fig. 6, upon an enlarged scale, illustrating the position of the retracting-arm and of the count-regulating device when the arm passes under an emptied check-receptacle and the count-regulating arm is engaged by the dog under said receptacle, its movement after it has passed to the point of check-delivery and is about to move back being illustrated by dotted lines; Fig. 13, a side elevation of the actuating-lever detached, illustrating the devices for preventing its reverse movements, and for releasing the stop-keys after they have performed their office in arresting the lever. Fig.

14 is a plan view; Fig. 15, a sectional view; Fig. 16, a detail in section illustrating a modification in the arrangement of the actuating-lever and its stop-keys, and Fig. 17 a detached vertical diametric section through the lower end of the spindle upon which the cylinder turns.

The check-cylinder A of my improved apparatus is constructed of a series of longitudinally-slotted tubular open-ended receptacles, A' A', of a proper diameter to receive the checks to be used, mounted in a circle side by side, and secured by circular end plates, $b$ $b'$. These tubular receptacles are made fast at their upper ends to and against the periphery of the upper circular plate, $b$, each with the slot therein turned outward, and their lower ends are led through and secured within circular apertures in the rim of the second lower circular plate, $b'$, the two plates $b$ and $b'$ being united, furthermore, by a central tube, $b^2$, upon whose ends the two plates are fitted.

Upon the under or outer side of the lower plate, $b'$, a series of check-supporting blocks, $c$ $c$, are formed to project downward from the interspaces between the openings of the lower ends of the receptacles. These blocks are enlarged laterally so as to partly overlap said openings (see Fig. 3) at a distance below the plate $b'$ slightly greater than the thickness of a check, as shown in Figs. 4 and 6. The office of these supporting-blocks $c$ $c$ is to so uphold the checks placed in the tubular receptacles A' A' with the lowermost check in position below the plate $b'$ and lower open end of the receptacle, as that they may be each readily drawn out laterally through the open space or interval between the blocks and plate by a dog or catch, $h$, (see Fig. 6,) made to move outwardly between the offsets and across the end of the tube, in manner as herein set forth. Each block $c$ serves also as a support for a dog, $d$, so pivoted as that one arm of the dog may swing against the surface of the lower check, or, if the receptacle be empty of checks, swing up therein, so as to allow its other arm to drop and depend below the blocks, for the purpose hereinafter described. The weight of a single check in the receptacle bearing upon the inner end of the pivoted dog $d$ will suffice to cause its outer end to swing up flush with the lower face of the block, as shown at the right in Fig. 4 and at the left in Fig. 6. To insure the descent of the checks, a loose weight, $e$, (see Figs. 4, 5, and 6,) of a diameter corresponding to that of the checks, is placed in each receptacle, to rest on the checks. The ends of each weight are recessed, as shown at $e'$ in Fig. 5, to permit the inner end of the dog $d$ to swing upward, as illustrated in Fig. 4 and at the right hand of Fig. 6, when, after the last check has been withdrawn, the weight drops to the bottom of the receptacle, and rests upon the offsets of the supporting-blocks.

The check-cylinder A is mounted in a vertical position, above the bed-plate B of the machine, upon a vertical rod or spindle, C, securely fitted in the bed-plate, to project upwardly therefrom through the central tube, $b^2$, of the check-cylinder, (see Fig. 6,) the latter being supported at a suitable distance above the bed-plate upon an offset, C', (see Figs. 6 and 17,) encircling the spindle, whereby sufficient space is left between the bottom of the cylinder and the bed-plate for the interposition of an annular guide-plate, D. (See Figs. 6, 7, 8, and 10.) The external diameter of this annular plate is somewhat greater than that of the cylinder A, so that it will extend fully under the receptacles A' in the cylinder when the latter is placed over it. It is so fixed over the bed-plate B, upon blocks D' D', as to leave an open space between it and both the bed-plate below and the bottom of the check-cylinder above.

E represents a sleeve, which fits upon the lower end of the spindle C, below its offset C', and turns loosely thereon, (see Fig. 17,) and E' a bracket projecting horizontally from the sleeve just above the level of the top of the annular guide-plate D. (See Figs. 6 and 10.) The lower end of this sleeve serves as the hub for a gear-wheel, $E^3$, which is engaged by a toothed segment, F, (see Figs. 7 and 8,) at the end of the longer arm, F', of a horizontal vibrating lever pivoted upon the bed-plate B. The opposite shorter arm, $F^2$, of this lever is coupled by a beveled gear, $F^3$, to a toothed segment, G, (see Fig. 9,) projecting at right angles therewith from the hub of an operating-lever, $G^2$, pivoted upon a stud-pin, G', projecting from the side of a standard or pedestal, $B^2$, upon the bed-plate B. (See Fig. 8.) The segment G embraces an arc of ninety degrees. The lever $G^2$ projects radially from its hub in a right line with one end of said segment G, (see Figs. 9 and 13,) and oscillates upon its pivot G' in a vertical plane. (See Figs. 1 and 9.) The gearing of the lever $G^2$ with the sleeve E, as described, is so proportioned as that a movement of the lever from a vertical to a horizontal position will cause the bracket E' upon said sleeve E and the devices carried thereby to make a complete revolution about the spindle C. The upper face of the guide-plate D under the bracket E' is formed with two concentric circumferential grooves, $m$ $m'$, therein, (see Figs. 6, 7, 8, and 10,) near to its inner and outer edges, and these two concentric grooves are connected at regular intervals by a series of similar transverse straight grooves, $n$ $n$, which are all inclined at an acute angle to the radius in the same direction and at the same angle, as illustrated in Figs. 7, 8, and 12. These transverse grooves $n$ $n$ correspond in number with the number of check-receptacles in the cylinder A, and the cylinder, when mounted upon the spindle C, is so adjusted and fixed as that each receptacle shall be directly over one of said transverse grooves. One end of the bracket E' is made to extend out to the inner edge of the annular guide-plate D, and an arm, E², is pivoted thereto to vibrate in a horizontal plane. This pivoted arm is of a length sufficient to extend from the bracket E' in a line tangential with a circle intermediate the inner edge of the guide-plate and the spindle to a point on the outer edge of the annular plate D in line radially with the center of the bracket, as shown in Fig. 7, its general inclination being in the same direction as that of the transverse grooves $n$ $n$ in the plate D. The outer end of the pivoted arm E² is fitted with a pin, $f$, (see Figs. 6 and 10,) adapted to enter and move in and along the circumferential and transverse grooves $m$ $m'$ $n$ $n$ $n$ in the plate, in manner as hereinafter described. By reason of the relation of the pivoted arm E² to the angle of inclination of the transverse grooves $n$ $n$ when the bracket E' is made to rotate about the spindle C in the direction of the inclination of said grooves $n$ the pin $f$ on the end of the pivoted arm E² will, if it be in the inner circumferential groove, $m$, be engaged by the first transverse groove which it reaches, and be made to move outward along said groove into the outer circumferential groove, $m'$, (see positive lines, Fig. 12,) and thereafter move in said outer groove so long as the arm continues to move in that direction, while, contrariwise, if the pin $f$ be in the outer circumferential groove, $m'$, (see Fig. 7,) and the arm be made to rotate in the opposite direction, the pin will enter the first transverse groove to which it is brought, and, moving along said transverse groove, will be guided thereby into the inner circumferential groove, $m$. (See Fig. 8.) A spring-actuated dog or tooth, $h$, (see Figs. 6, 10, 7, 8, and 12,) is pivoted between standards, or in a grooved block upon the upper side of the outer end of the pivoted arm E², in such manner as that it will remain rigid in an upright position when the arm moves outwardly, but will yield and give way if it meet with an obstacle when the arm is moving in toward the spindle C. The height of this dog $h$ above the annular guide-plate D is so adjusted as that when the check-cylinder A is fixed over the plate the end of the dog will be in position to pass in through the space between any two of the stop-blocks $c$ $c$, (see Fig. 6,) as the pin $f$ in the arm E² passes outwardly through that one of the transverse grooves $n$ which is under said blocks, and it will pass so closely under the lower edge of the check-receptacle A' over said blocks as to come into direct contact with the edge of the lowermost check therein as it rests upon the offsets from the two stop-blocks beneath it; hence, if the arm E² be carried past the transverse groove $n$ under any one of the check-receptacles A', and its movement be then reversed, its guide-pin $f$, moving along the inner circumferential groove, $m$, of the guide-plate D, will, upon the reversal of the movement, be made to enter the first transverse groove which it reaches, and to pass outwardly along the same into the outer circumferential groove, $m'$. In so doing it will carry the dog $h$ into contact with the edge of the lowermost check in the given receptacle, so that the dog will push the check from its seat upon the offsets of the stop-blocks $c$ $c$ upon which it rested out upon a circumferential flange or ledge, $i$, (see dotted lines, Fig. 8,) formed in the casing W, and thence upon and along said ledge $i$ to a discharge-opening, $p$. The check will drop through and out from the opening automatically by its own weight. This discharge-opening $p$ is located opposite the one point between the two transverse grooves at which the end of the arm E² is invariably arrested in its revolution in either direction. This positive arrest of the arm E, when moving in either direction, is produced by the arrest of the actuating-lever G² when it reaches a horizontal position in one direction, (see Fig. 1,) and a vertical position in the opposite direction, (see Fig. 9,) the movement of the lever from the one position to the other being sufficient, by reason of the intermediate gearing, as described, to cause the arm E² to make a complete revolution about the spindle C. The arm E² is brought to a stop just beyond the transverse groove under any given one of the check-receptacles A' A', as described, by simply arresting the movement of the lever G² at the proper point. This is accomplished positively by means of a series of stop-pins, J J, sliding horizontally in recesses in a supporting block or frame, H, against whose inner face the inner face of the lever sweeps in its movement. (See Fig. 9.) The stop-pins are disposed at equal distances apart in two concentric rows upon arcs having the axis of the lever G² as its center, (see Fig. 9,) so that they may project at their outer ends beyond the inner face of the frame H, and are so arranged as that the pins in one row break joint with those in the other. A stop-pin is thus provided for each receptacle A' in the check-cylinder A, the first pin at the upper end of the one row representing the first receptacle, the first in the other row the second, the second in the first row the third, the second in the second row the fourth, and so on. Each stop-pin J is automatically retracted within its recess, so that its end shall be flush with the face of the frame, by means of an encircling spiral spring, J³, (see Fig. 11,) and it is actuated and forced outward at pleasure by means of a key-pin, J⁴, moving vertically in a suitable recess at right angles therewith. The portion of the key-pin J⁴ opposite to the inner end of the horizontal stop-pin J is notched circumferentially with a beveled-face notch, $g$, and the inner end of said stop-pin J is formed with a counterpart bevel, J⁵, so that a downward or inward movement of the pin J⁴ will force the pin J outward. A second circumferential notch, $g'$, is formed about the pin J⁴ immediately above the beveled-face notch $g$, so that after the key has forced the stop-pin outward the latter is caught and held by the engagement of its inner end with said second notch. (See dotted lines, Fig. 11.) The key-pin J⁴ is forced inward at pleasure by means of a cylindrical key, K, fitting as a cap upon its outer end, a spiral spring, K', being inserted between them to render the pressure elastic. The keys K K for the key-pins J⁴ J⁴ project outwardly in regular order and in a double row from the top of the frame H, the top of the frame being made, for convenience, in the form of an arc having the axis of the lever G² as its center, and the handle of the lever made to project beyond the same, as shown in Figs. 1 and 9. The keys are each marked or numbered to correspond with the denomination of the checks placed in the receptacle represented by the key, and opposite to which the check-retracting finger $f$ of the arm E² is brought when the lever G² is stopped by the movement of said key. After the stop-pin J has been forced outward far enough to engage and arrest the lever G² as it moves from a vertical toward a horizontal position, it is drawn still farther outward, far enough to disengage its inner end from the second notch, $g$, in the key-pin, and thereby release the latter by means of a beveled edge, R⁵, upon the upper end of a plate, R, pivoted to the inner face of the lever G. (See Figs. 13, 18, and dotted lines, Fig. 9.) The beveled edge R⁵ of this plate is adapted to so engage a beveled notch, $k$, cut in the end of the pin J, (see Fig. 11,) as that the contact of the opposed beveled faces, when the edge R⁵ of the plate R enters the notch $k$, will draw out the pin; hence, when the movement of the lever is arrested by the stop-pin, the stop-pin will be thereby disengaged from the key-pin, whereupon the key-pin will be thrown out of its spring K' to its first position, and the stop-pin be left free, when the lever is moved back therefrom, to move inward under the action of its spring J³ to its first position.

To prevent a further forward movement of the lever G² after the stop-pin which arrested it has been withdrawn as described, a segmental rack, V, (see Figs. 9 and 13,) is formed upon the upper edge of the pedestal or standard B', to be overlapped by the rim of a double-toothed dog or detent, R², pivoted against the outer face of the lever G², (see Fig. 13,) so that if the detent be turned in one direction the rack will be engaged by the one tooth and in the opposite direction by the other tooth. The lower end of the pivoted plate R on the lever G² is forked, and an offset, R', from the double-toothed detent R², projects up between the two arms of the fork, so that when the plate is made, by the engagement of the beveled edge R⁵ of its upper end with one of the stop-pins J, to swing upon its pivot in one direction the one tooth of the detent R shall be thrown downward, as shown in Fig. 13, to engage the segmental rack V, and prevent a further movement of the lever. When the lever attains its upright position, the plain edge of the upper end of the pivoted plate R strikes against a stop-pin, G³, and the plate is thereby swung back so as to cause the other tooth of the detent to engage the rack. The connection of the offset R' of the detent with the plate R is made more exact, and an elastic play is given to the detent by carrying a rod, R⁴, through a slot in the offset R', and through lugs on the two arms of the plate R, and inserting spiral springs $r\ r$ upon the rod, between the offset and the lugs on either side, the rod being pivoted in the slotted offset. The vibrating movement of the plate R upon the face of the operating-lever G² is limited by means of a pin, 24, projecting from the lever through a transverse slot, 25, in the plate R, as shown in Fig. 13.

L, Figs. 8 and 9, represents the shaft carrying the units-wheel 26, Fig. 8, of an adding or counting machine of any approved form, and L' a toothed wheel turning loosely upon said shaft, and which is geared to a toothed segment, L², projecting from a hub on the inner side of the lever G², which encircles its pivot, the wheel and segment being so proportioned as that the movement of the lever from the vertical to a horizontal position shall produce a complete revolution of the wheel. Said toothed wheel L' is affixed to a plain lateral disk, L³, of a larger diameter, formed with a radial slot therein to receive a pin, L⁴, (see Fig. 9,) projecting laterally from an arm, L⁵, extending from the end of the segment L², the arm and slot being so adjusted as that the pin shall enter the slot at the moment the segment passes out of engagement with the toothed wheel L'. By this means the register of the segment with the toothed wheel is invariably maintained and the gearing of the two insured upon a reverse motion of the segment, while a slight independent movement of the lever and segment is provided for. A pawl, M, (see Fig. 8,) is pivoted upon the inner side of the disk L³, to engage a ratchet-wheel, M', upon the shaft L of the counting mechanism. An offset, $s$, from this pawl rests upon a conical sleeve, N, adapted to move loosely longitudinally upon the shaft L, with its smaller end toward the disk, so that as it approaches the disk it will, by its engagement with said offset $s$, operate to lift the pawl out of its engagement with the ratchet-wheel M'. The sleeve N is retracted from the disk by means of an interposed spring, $l$, and it is carried toward it by means of lateral wedge-shaped offsets $t\ t$ upon the slotted end of a sliding bar, N³, (see Figs. 8 and 10,) embracing the shaft L, and moving at right angles therewith, as shown in Fig. 8, between the sleeve and a fixed plate, N². The outer end of the bar N³ is bent upward, as at N⁴, to admit of being coupled to the upper end of a vertical crank-arm, N⁵, upon a horizontal rock-shaft, N⁶, (see Figs. 8 and 9,) at the front of the machine. Said rock-shaft extends parallel with the shaft L (see Fig. 8) from a point opposite the wedge-shaped offset $t$ to a point beyond the spindle C. An arm, O, rigidly attached to the rock-shaft N⁶, and extending thence at right angles therewith, carries upon its free end an annular plate or ring, O', which encircles the sleeve E upon the spindle C. (See Figs. 6, 7, 8, and 10.) The rise and fall of this ring O' produces the oscillation of the shaft $N^6$, which operates mediately, as described, to throw the pawl M in and out of gear with the ratchet-wheel M' on the counting-shaft L. This rise and fall of the ring O' is produced by means of a wedge-shaped toe, P, Fig. 6, upon the lower end of a vertical spindle, P', and which, by the rotation of said spindle, is carried in and out under said ring. The spindle P' is mounted in a bearing formed in the bracket E', near to the middle thereof, (see Figs. 7, 8, and 12,) and terminates at its upper end, above said bracket, in a crank-arm, $P^2$, terminating in a finger, which extends far enough to engage, as shown in Figs. 6 and 12, a pivoted dog or catch, $P^3$, upon an offset extending from the pivoted arm $E^2$ at a right angle therewith, out beyond its joint with the arm E'. This dog $P^3$ is pivoted so that it will yield to permit the finger from the arm $P^2$ to swing freely over it in an outward direction from the pivoted end of the arm $E^2$, but will engage it and prevent its return toward said arm, as shown in Fig. 12, until the arm $E^2$ is so far swung inward by the passage of its guide-pin $f$ into the inner circumferential groove, $m$, of the guide-plate D, as shown in Fig. 8, as to carry the dog $P^3$ thereon out beyond the end of said finger H. The crank-arm $P^2$ is thrown out in position to cause its finger to be engaged and held by the dog $P^3$ by means of a horizontal catch-plate, Q, pivoted upon the end of an arm, Q', extending from the bracket E' out over the annular guide-plate D. The inner end of this catch-plate Q is coupled to the outer end of the crank-arm $P^2$ by a horizontal connecting-bar, $Q^2$, pivoted to the one and the other. The outer edge of the catch-plate is so shaped as to extend, when the plate is free, at an acute angle across the center of the interval between the stop-blocks $c\,c$, under the receptacles A' A' in the check-cylinder A and immediately beneath them, so as to be engaged, when the bracket E' moves back, by the lower end of the first dog, $d$, which, by the absence of a check in the receptacle, may be left free to drop below the bottom of the stops, as shown in Fig. 6. The catch-plate Q is brought automatically to this position by means of a spring, $r'$. (See Figs. 7 and 8.) The contact of the lower end of the pendent dog $d$ with the inclined edge of the pivoted plate Q, as the plate is carried backward in a retrograde movement of the bracket E' in the direction indicated by the arrows in Figs. 7 and 8, will operate to swing said plate inward, and by means of the connecting-bar $Q^2$ to swing the finger on the end of the arm $P^3$ outward into position to be caught by the dog $P^2$, as shown in Fig. 12. The adjustment of said finger with reference to the offset carrying the dog $P^2$ is so made as that the dog will not engage the finger so long as the guide-pin of the arm $E^3$ is in the inner circumferential groove, $m'$, but will take place at the instant it leaves said groove to enter a transverse groove. This movement of the guide-pin into a transverse groove occurs, however, each time the pin passes the entrance to one of said transverse grooves, in whichever direction the pin is moved, in obedience to the pressure of a spring, $u$, fitted upon the edge of the arm Q' to bear against the arm $E^3$, so long as its guide-pin is in the inner circumferential groove, $m$. A spring, $u'$, fitted upon the edge of the annular-plate D, bears against the arm $E^3$, when it has come to a stop opposite the discharge-opening, so as to force its pin $f$ into the first transverse groove and lead it thereby back into the inner circumferential groove so soon as the arm is made to move back, (see Fig. 7;) hence the end of the arm $E^3$ always travels over the inner groove and on the inner side of the bottom of the check-receptacles when moving back, in readiness to be carried forward across under one of said receptacles so soon as its movement is reversed. The bar $N^2$ is moved, and the pawl M consequently lifted from the toothed wheel M', independently of the check-delivering mechanism, by means of a spindle, 2, (see Fig. 8,) mounted in bearings at a right angle to the end of the sliding bar $N^3$, and which is fitted with an eccentric or an arm, 3, upon its inner end to bear against the end of the bar $N^3$, (see Fig. 9,) so that a movement of the bar to raise the pawl will be produced by turning the spindle. The outer end of the spindle projects beyond the face-plate of the counting mechanism, and is fitted with a crank, 4. By turning this crank so as to rotate the spindle 2 far enough to cause its eccentric or arm 3 to force the bar $N^3$ from it, the units-wheel will be thereby disconnected from the check mechanism, to permit the adding-wheels to be set back to zero, when required, by the lifting of the pawl M on the disk $L^2$ of the check mechanism from the ratchet-wheel M' on the shaft L, carrying said units-wheel. The check-cylinder mounted upon the spindle C admits of being rotated thereon to bring the check-receptacles successively to the front opening therein, (shown in Fig. 1,) which is closed by the door $A^2$. The proper registry of the receptacles with reference to a correspondence of the denomination of the checks in each with the movement of the check-retracting device as produced by the stop pin and key indicating said denomination, is insured by means of a spring-actuated stop-pin, 5, (see Fig. 6,) which, playing through the top plate, 7, of an outer casing, 8, adapted to fit over the check-cylinder, engages an aperture, 11, in the top plate, $b$, of the cylinder. The casing 8 is itself fixed and secured upon the base of the machine, and it is finished by a detachable cap, 9, fitting upon the top thereof, and which covers and conceals the stop-pin 5. The upper end of the stop-pin is formed with a head, 10, by which it may be readily lifted when it is desired to rotate the cylinder.

In the operation of my improved machine the wheels of the adding mechanism are at first set to zero. To accomplish this the units-wheel is disconnected from its gear with the check-delivery mechanism, as hereinbefore described, by turning the crank 4 on the spindle 2 (see Fig. 1) until the pin or eccentric 3 (see Fig. 9) has forced inward the bar $N^2$ far enough to cause the cams $t$ thereon to carry the conical sleeve N under the offset $s$ of the pawl M, and lift the latter from its engagement with the toothed wheel M'. So soon as this has been done, the bar $N^2$ is released by turning the crank 4 to its first position, so as to throw the units-wheels into gear with the adding mechanism. By lifting the stop-pin 5 in the top 7 of the casing 8 of the check-cylinder the check-receptacles A' A' are successively brought to the front opening in the casing by a rotation of the cylinder, so that each may be filled with checks of a different denomination, the lowest being placed in that receptacle which, when the stop-pin 5 is dropped into the aperture in the top plate, $b$, of the cylinder, is next to the discharge-opening $p$, and the remainder in regular order of progression in the remaining cylinders. When the check-receptacles are thus filled, the check-cylinder is fixed immovably by the engagement of the stop-pin 5 with the aperture 11 in the upper plate, $b$.

When the apparatus is not in use, its actuating-lever $G^2$ is in a vertical position, as shown in Fig. 9, and the check-retracting finger $h$ is carried thereby to a position immediately in front of the receptacle containing the checks of lowest denomination. The lowermost check in said receptacle bearing upon the upper end of the swinging catch or dog $d$, pivoted between the blocks $c\ c$, upon which the check rests, causes the lower end of the dog to swing up clear of the end of the arm Q', which revolves with the twin arm $E^2$ about the spindle C. By depressing any one of the keys K the first stop-pin J corresponding thereto, will be forced out in position to engage the actuating-lever $G^2$, and as the key-pin $J^4$ under the key will be caught by the engagement of its annular shoulder $g'$ with the rear end of the stop-pin (see Fig. 11) the stop-pin J will remain projecting in position to stop the lever. If, after depressing the key, the lever $G^2$ be pulled forward until it strikes the first of the projecting stop-pins J, the movement of the lever communicated through the segmental and beveled gears G $F^3$ to the horizontal pivoted lever $F^2$ will cause a partial rotation of the sleeve E. This movement of the sleeve E will carry the bracket E', attached thereto, backward, and with it the jointed arm $E^2$. The pin $f$ on the outer end of the arm $E^2$ will, as the arm moves back, enter the first transverse groove $n$ on the plate D, and will be carried through it (see Fig. 8) into the inner circumferential groove, $m$, which it will then follow so long as the backward movement of the arm $E^2$ continues. As the pin $f$ carries with it the outer free end of the pivoted arm $E^2$, this end of the arm will swing inward to adapt itself to the movements of the pin. When the free end of the arm $E^2$ is thus carried rearwardly between the blocks $c\ c$ under the receptacle above the transverse slot $n$ through which the pin $f$ is moving, the upwardly-projecting retracting-finger $h$, pivoted upon the end of the arm, will yield as it strikes the edge of the lowermost check resting on the blocks $c\ c$ at the bottom of said receptacle, so as to pass freely under the check. When the lever $G^2$ reaches the projecting stop-pin and is arrested thereby, the outer end of the arm $E^2$ will have been carried back over the inner groove, $m$, on the plate D to a point immediately back of the transverse groove under the receptacle containing checks corresponding with the denomination indicated upon the key K which was depressed. If, now, the movement of the lever be reversed, and the lever thrown back to its first position, the sleeve E, bracket E', and arm $E^2$ will be thereby moved forward again to their first position, and in this forward movement of the arm $E^2$ its pin will enter the first transverse groove and pass along said groove under the check-receptacle above referred to and into the outer circumferential groove, $m'$. As the outer end of the arm $E^3$ is thus carried under said receptacle, its retracting-finger $h$ will engage the lowermost check in the receptacle and slide it out therefrom into the circumferential ledge $i$ on the inside of the casing W, and then push it forward along said ledge to the discharge-opening $p$, where it will drop out from the machine. When the lever $G^2$ is thrown forward and strikes the projecting stop-pin, the front beveled edge of the pivoted plate R on the face of the lever will engage the opposite beveled face of the notch in the end of the stop-pin, and thereby draw the pin out far enough to release it from the shoulder on the key-pin $J^4$. The key-pin, being thus set free, will move up and carry the key back to its first position, leaving the stop-pin held by its engagement with the plate R, until, by the reverse movement of the lever, it is disengaged and set free to spring back to its first position. The engagement of the plate R with the stop-pin will, moreover, (see Fig. 13,) cause it to swing so as to cause its pivoted dog R to engage the segmental rack V, and thereby prevent, independently of the stop-pin, a further forward movement of the lever. When the lever $G^2$ is thrown forward, as above described, against a stop-pin, its toothed segment $L^2$, gearing into the wheel L', carrying the pawl M, will swing said pawl freely around the toothed wheel M' upon the spindle of the units-wheel of the adding mechanism for a distance proportional to the length of the movement of the lever, so that when the lever is carried back in its first position the reverse movement of the pawl-wheel L' will, by reason of the engagement of its pawl M with the wheel M', cause a corresponding rotation of the units-wheel;

hence each time a check is withdrawn the units-wheel will be moved a distance corresponding with the denomination of the check so withdrawn. As the lever reaches its first position, the pin L upon the arm L⁵, extending from the segment L², carried by the lever, (see Fig. 9,) will drop into the recess in the rim of the disk L³, and thereby lock said disk, so that no movement of the adding mechanism can take place while the lever G² is at rest. When a receptacle contains no checks for delivery, (see at the right in Fig. 6,) the upper end of the dog d, pivoted between the blocks c c under the receptacle, will swing upward so that its lower end will be in position to engage the edge of the plate Q upon the fixed arm Q′, carried with the jointed arm E³, by the bracket E′ on the sleeve E. As, in the return movement of the sleeve and bracket produced by the return of the lever G² to its vertical or first position, (see Fig. 9,) the arm Q′ is carried n manner as described under the check-receptacle, the edge of the plate Q, pivoted thereon, will come into contact with the lower end of the dog d, so as to cause the plate to turn upon its pivot. This movement of the plate Q will throw outward the arm P², which is connected thereto by the pivoted link Q², until the finger or the end of said arm P² is engaged by the catch P³ on the inner end of the arm E². The movement of the arm P² will also cause the spindle P′, to which it is fixed, to rotate, and thereby carry the toe P, projecting therefrom, under the ring O′, to lift it. The lifting of said ring O will operate to oscillate the lever L, and thereby move the sliding bar N³, so as to force the conical sleeve N under the offset on the pawl M, to lift it from the toothed wheel M′ on the spindle of the units-wheel, and the latter will be thus thrown out of gear, so that the subsequent movement of the lever G², when returned to its first position, will not move the units-wheel. As the arm E² begins to move back at the next forward movement of the lever G², the inward movement of its outer end, as it is carried across from the outer to the inner circumferential groove, (see dotted lines, Fig. 12,) will operate to disengage the catch P³ from the arm P², and allow the latter, under the influence of the spring r′, to return to its first position. It is evident that the operation of this mechanism is not dependent upon the position of the lever G², and Figs. 14 and 15 illustrate the lever when arranged to swing in a horizontal plane. The horizontal lever G⁵ is pivoted to the bed-plate B in like manner as is the lever F, Fig. 7, its inner end being geared similarly by a toothed segment, 12, to the toothed wheel E³ of the sleeve E. A horizontal segmental beveled rack, 13, upon its outer arm is adapted to gear likewise with the toothed wheel L′, which actuates, in manner as hereinbefore described, the adding mechanism of the machine. The outer end of the lever G⁵ is bent upward, (see Fig. 15,) to pass freely over the vertical keys 14 14, fitted to play in seats in the bed-plate B in an arc having the pivot of the lever as its center. A spring, 15, is placed under each key, (see Fig. 15,) and the key is secured to the outer arm of a pivoted bent lever, 16, whose opposite inner arm, when the key is depressed, will move up through an aperture in the bed-plate B, so as to project above the plate and serve as a stop, 17, for the lever. The lever 16 is pivoted upon a pin passing through two lugs, 18 18, on the under side of the bed-plate, (see Fig. 16,) and has a slight lateral movement on its pivot-pin. The stop 17, formed by the inner end of the lever, is notched laterally, as at 19, and a counterpart beveled offset, 20, is formed on the side of the aperture to engage the notch when the stop is forced up. A spring, 21, is inserted in the aperture opposite to the offset, so as to bear laterally against the stop and force it over toward the offset 20. A recess, 22, is cut in the under side of the lever, to permit the lever to pass over the stop until it is central over the corresponding key, and the rear closed end of the recess, coming into contact with the elevated stop 17, will arrest the further movement of the lever, and by forcing the stop back from the offset 20 leave it free to drop back until again forced up by a depression of the key. To prevent its dropping back, however, until the lever is moved backward, the wall at the inner end of the recess 22 is formed with a beveled edge, as shown in Fig. 16, to engage the notch 19 in the stop when it strikes it, so that, although the stop is carried forward away from the offset 20 in the aperture, it will be still held up by said beveled edge until the lever is moved back.

The pivoted bent lever 16 constitutes in effect a mechanical equivalent for the combined stop and key pins J J⁴, hereinbefore described, in arresting the forward movement of the lever.

I claim as my invention—

1. The combination of a reciprocating lever, a series of adjustable stops to limit its movement, a corresponding series of check-receptacles, retracting mechanism, substantially as described, operated by the movement of said lever for the selection and delivery from said receptacles of checks of various denominations, and intermediate gearing, as described, whereby the movement of the lever to either stop operates to carry the retracting mechanism to the receptacle corresponding to said stop, and its return movement operates to carry the retracting device, with a check withdrawn from the receptacle, back to its initial point for a delivery of the check thereat, all substantially in the manner and for the purpose herein set forth.

2. The combination, with the units-wheel of an adding or counting machine, and with a pivoted lever actuating said units-wheel, of a series of stop-pins mounted, substantially as herein described, to move transversely into contact with the lever to stop the same, each pin being distinguished by a number indicating the exact relative proportion which the distance covered by the lever in reaching said pin bears to the entire length of the arc over which the lever must sweep in causing the units-wheel to make a complete revolution, whereby a movement of either pin to engage and stop the lever will determine the extent of the rotation of the units-wheel produced by the lever in reaching said stop, and the number of units which will thereupon be added to the sum previously indicated by the adding or counting mechanism will correspond to the number upon said pin, all substantially in the manner and for the purpose herein set forth.

3. The combination, with the units-wheel of an adding or counting machine, a pivoted lever actuating said units-wheel, and a series of movable stop-pins mounted, substantially as described, transversely to the plane of movement of the lever, each in position to permit of its engaging and stopping the lever when the latter is thrown forward to actuate the adding mechanism, of a rotating spindle so geared, as described, mediately to the lever as that the complete movement of the lever to produce a complete rotation of the units-wheel shall cause the spindle to describe a complete circle, a horizontal arm secured to said spindle, a series of vertical check-receptacles corresponding in number with the stop-pins, mounted in a circle above said arm, an annular guide-plate mounted horizontally under the arm, made wide enough to extend radially beyond the circle of check-receptacles, and formed with an inner and outer concentric groove upon its upper face, and a series of inclined grooves extending from the one annular groove to the other directly under each receptacle, devices, substantially as described, connected with said arm, whereby when it passes under a receptacle it will withdraw therefrom the lowermost check therein, and a guide-pin projecting from the free end of the arm to enter the grooves in the guide-plate, whereby the outer end of the arm will follow the outer groove in its backward movement, and will, upon a reverse or forward movement, enter the first transverse groove and be carried thereby under the corresponding check-receptacle to the inner groove, and thence follow it to the starting-point, substantially in the manner and for the purpose herein set forth.

4. The combination, with each other, and with the mechanism as herein described, to connect the same, of a series of check-receptacles mounted in a circle at equal distances apart, to contain in order checks of different denominations, severally differing in value by a constant number, a corresponding series of keys each numbered in order with the figures representing the denomination of the checks in the corresponding receptacle, a units-wheel in an adding-machine bearing in order upon its face or periphery a series of numerals corresponding to the denominations of the checks in the several receptacles, devices, as herein described, for producing a delivery of the check from any one of the receptacles, a reciprocating lever actuating by its movement both the check-delivering devices and the units-wheel, and a series of movable pins placed at equal distances apart in position each to engage and stop in its outward position the movement of the lever, whereby at each full stroke of the lever the units-wheel shall make a complete revolution to indicate and add a number of units representing a check of the highest denomination, and a check of a corresponding denomination shall be delivered from its appropriate receptacle, and, upon the arrest of the lever in its movement by the movement of any one of the pins, the units-wheel, being rotated a distance proportional to the number of the pin, shall indicate and add a corresponding number of units, and a check of a corresponding denomination shall be delivered from its appropriate receptacle, all substantially in the manner and for the purpose herein set forth.

5. The combination, with a vertical spindle, a series of vertical check-receptacles mounted in a circle about said spindle, and slotted check-supporting blocks fitted under the open end of each receptacle, of a horizontal annular plate of larger diameter mounted at a short distance beneath said blocks, and formed with an outer and an inner concentric groove in its upper face, and with a series of transverse grooves extending from the one annular groove to the other centrally under each cylinder at an angle with the radius of said annular grooves, a retracting-arm projecting horizontally from and jointed to a bracket upon a sleeve encircling the foot of the spindle, and whose outer end extends over the face of the grooved annular plate, a pin in said outer end engaging the connected grooves in the plate, a dog pivoted to the same end to project automatically upward, and adapted thereby to pass through the opening between the stop-blocks under each receptacle, and a reciprocating lever for actuating said jointed arm, geared, substantially in manner as described, to the sleeve, and limited in its movement to cause by a complete stroke thereof a single complete revolution of the sleeve and jointed arm about the spindle, all substantially in the manner and for the purpose herein set forth.

6. The combination, with a vertical spindle, a series of vertical check-receptacles mounted in a circle about said spindle, a dog pivoted under each receptacle, to depend therefrom when not upheld by the weight of a check in the receptacle, a horizontal bracket revolving upon the lower end of said spindle, an arm projecting from the bracket under said receptacle, a reciprocating lever geared to said spindle and producing by its full stroke in either direction a complete revolution of the arm back or forth about the spindle, a units-wheel in an adding or counting mechanism, a spindle carrying said wheel, and a pawl and ratchet-wheel gearing the spindle to said reciprocating lever, of a cam device adapted to disengage said pawl from its ratchet-wheel, a ring encircling the spindle beneath the revolving bracket, a system of levers, substantially as described, connecting the ring and cam device, whereby the lifting of the ring will produce a movement of the cam to disengage the pawl, a vertical shaft carried by the bracket, and a cam device fixed upon said shaft to engage the ring, whereby a rotation of said shaft is made to lift the ring, a latch-plate pivoted upon the outer end of the bracket-arm, to be engaged by the dog under either receptacle when depending therefrom, a coupling-bar connecting the latch-plate with a crank-pin on the cam-shaft, an annular horizontal plate mounted beneath the check-receptacle and formed with two concentric guide-grooves connected under each receptacle by a transverse inclined groove, a pivoted retracting-arm projecting horizontally from the bracket, to pass under the check-receptacles and over the horizontal plate, and which is made to swing in and out under said receptacles by the engagement of a projecting pin with said grooves, and a detent carried by the inner end of said arm, to engage a trigger upon the crank-pin of the cam-shaft, whereby the movement of the latch-plate produced as the sleeve and bracket is reversed by its engagement with the dog left pendent under any one of the check-receptacles by the removal of all the checks therefrom, will lift the cam, and thereby release the pawl in the gear of the actuating-lever with the adding mechanism upon the passage of the retracting device beneath an empty receptacle, all substantially in the manner and for the purpose herein set forth.

7. The combination, with a check-receptacle, A', having a lower open end, and with a retracting-arm, and mechanism, substantially as described, for causing the retracting-arm to pass transversely beneath the lower end thereof, of the supporting-blocks $c\ c$, for upholding the checks in the receptacle, formed to present a lateral opening for the withdrawal of the checks singly from the lower end of the receptacle, and a transverse opening to permit of the passage of a retracting-arm between them under the receptacle, substantially in the manner and for the purpose herein set forth.

8. The combination, with an open-ended check-receptacle, A', a retracting-arm, and mechanism, substantially as described, for causing the retracting-arm to pass transversely beneath the lower end of the receptacle, supporting-blocks $c\ c$, to uphold the checks, and a dog, $d$, so pivoted to one of the blocks as that one arm of the dog may swing into the receptacle when it is emptied of checks, and permit the other arm to depend therefrom, as and for the purpose specified, of a weight fitted to drop freely within the receptacles, and recessed at one end to permit the dog $d$ to swing inward when the weight rests with its recessed end upon the blocks $c\ c$, substantially in the manner and for the purpose herein set forth.

9. The combination, with the lever $G^2$, actuating the check retracting and counting or adding mechanism in a check-machine, substantially as described, and with each stop-pin J J, operating to limit its movement, of a key-pin, K, moving at right angles to the stop-pin, formed with an annular beveled recess in its length adapted to engage a counterpart bevel at the inner end of the stop-pin, and with a groove encircling it above its beveled recess, a spring, $J^3$, operating to carry the stop-pin against the key-pin, and a spring, K', operating to bear up the stop-pin, whereby the inner end of the stop-pin, upon the full depression of the key and upon the projection of the stop-pin, will be engaged by the groove, and both pins be thereby locked until a release is effected by an upward movement of the stop-pin, substantially in the manner and for the purpose herein set forth.

10. The combination, with the lever $G^2$ and the check retracting and counting or adding mechanism in a check-machine actuated thereby, substantially as herein described, and with a series of stop-pins mounted to reciprocate into and out of engagement with said lever, of a segmental rack supported against the outer face of the lever, and whose arc is described about the pivotal axis of the lever at its center, a double-toothed dog pivoted against the side of the lever over the segmental rack, so that the one tooth or the other shall engage said rack as the dog is turned in one direction or the other, a lug projecting from the dog at a central point diametrically opposite its teeth, and a centrally-pivoted plate vibrating against the face of the lever above the dog, having its upper end beveled on its front edge, to engage a counterpart beveled recess on the end of each stop-pin to draw it outward, and whose lower end is forked to embrace the lug of the dog, all substantially in the manner and for the purpose herein set forth.

In testimony whereof I have signed my name to this specification in the presence of two subscribing witnesses.

LOUIS T. WEISS.

Witnesses:
JOHN A. ELLIS,
J. F. ACKER, Jr.